Patented Aug. 19, 1952

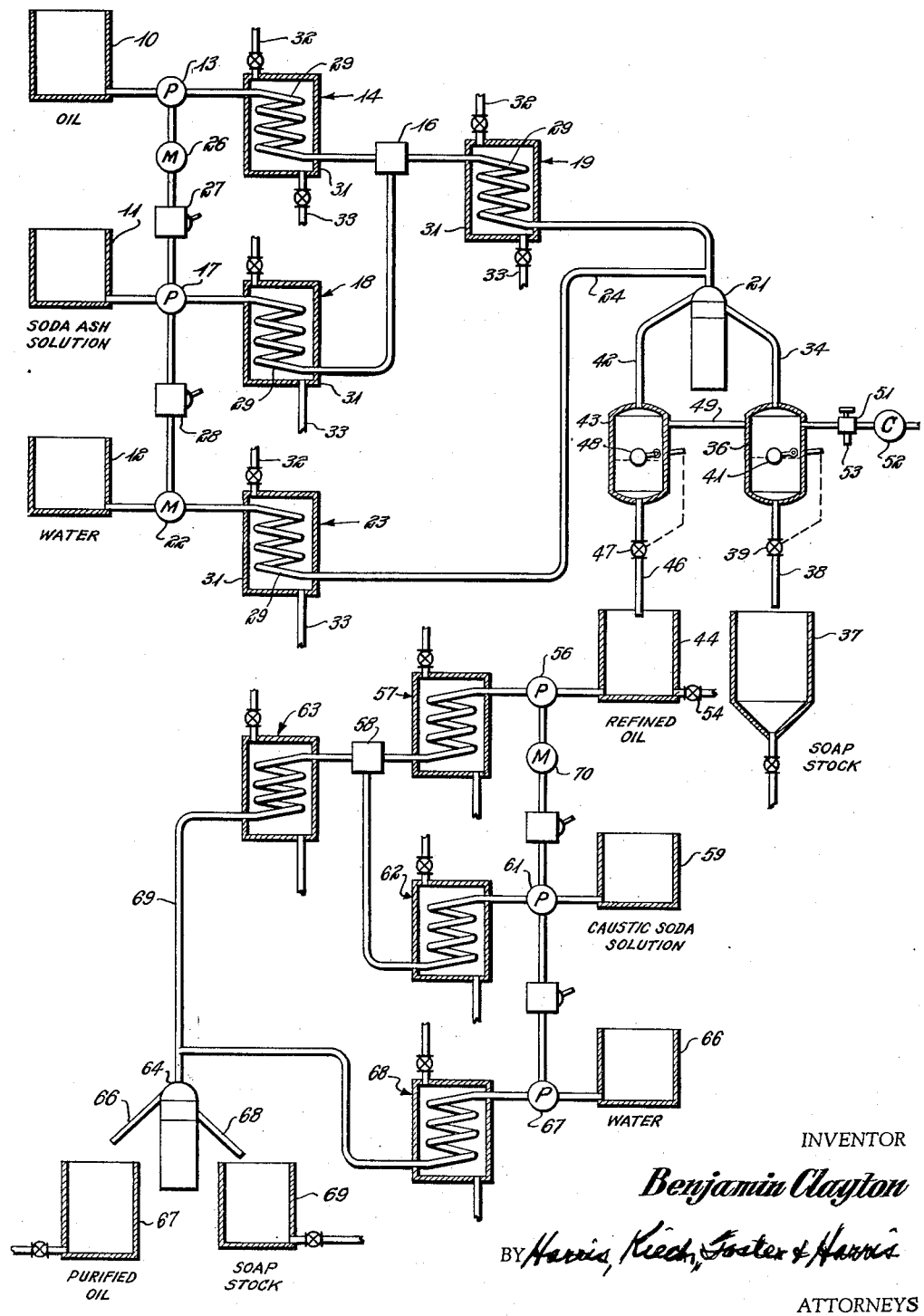

2,607,788

UNITED STATES PATENT OFFICE 2,607,788

REFINING OF GLYCERIDE OILS

Benjamin Clayton, Pasadena, Calif.

Application September 27, 1950, Serial No. 187,048

4 Claims. (Cl. 260—425)

This invention relates to the refining of glyceride oils, and more particularly, to an improved continuous alkali refining process employing soda ash as the refining reagent and in which refining losses are minimized while at the same time a high quality oil is produced.

The original commercial continuous process of alkali refining glyceride oils, which process is still extensively employed, involves the continuous mixing of an aqueous solution of caustic soda with the oil in an amount sufficient to neutralize the acidity of the oil and also provide a substantial excess. The mixture is continuously centrifugally separated to separate soapstock from the oil and the separation is usually carried out at a temperature between 120 and 160° F., this temperature being produced by heating the materials in stream flow either before mixing or after mixing. While such processes produce a high quality oil and materially reduce refining losses over the earlier developed batch process of alkali refining of glyceride oils, a substantial loss of neutral oil results both from saponification of neutral oil by the excess caustic soda and from entrainment of a considerable amount of neutral oil in the soapstock separated from the oil.

Since soda ash will not saponify neutral oil at any temperature encountered in a refining process, and is available in large amounts at low cost, it is a desirable reagent for alkali refining of glyceride oils. A process known as the soda ash process is also in large scale commercial operation and involves the addition of an aqueous solution of soda ash to the oil in substantial excess. The resulting mixture cannot be satisfactorily separated under ordinary conditions since carbon dioxide is evolved and interferes with the separation of the soapstock from the oil. The soda ash process referred to above overcomes this difficulty by introducing the mixture into a flash chamber while at an elevated temperature and subjecting it to a vacuum therein. The carbon dioxide and the major portion of the water are thereby removed from the mixture. The resulting dehydrated mixture is thereafter rehydrated with additional soda ash solution and continuously separated in a centrifugal separator.

With light colored oils, for example corn oil or peanut oil, a satisfactory refined oil may be directly produced and the refining losses are very low. As stated above, the soda ash will not saponify neutral oil and the dehydration and rehydration steps condition the oil for very effective centrifugal separation such that losses of oil by saponification thereof or by entrainment of the oil in the soapstock are substantially eliminated. For dark colored oils, such as cottonseed oil and in some cases even for light colored oils, it is desirable to re-refine or caustic wash the oil employing a small amount of relatively concentrated caustic soda solution as the reagent. Losses in the re-refining step are also very small and a high quality neutral oil is produced with a minimum of refining losses.

It has also been suggested that glyceride oils could be alkali refined using soda ash as the refining reagent by employing a very large excess of soda ash. That is to say, an amount of soda ash at least three times that required to neutralize the acidity of the oil, and preferably a greater amount, prevents the liberation of carbon dioxide since the carbon dioxide will combine with the soda ash to form sodium bicarbonate. This suggested process requires large amounts of refining reagent and consequently the separation of a large amount of excess reagent with the soapstock.

The present process departs from the prior processes above discussed by employing a moderate excess of soda ash as the refining reagent and conducting the process at relatively low temperatures and under pressure to prevent the liberation of carbon dioxide before or during the separation step. Thus the amount of soda ash employed will usually range from $1\frac{1}{4}$ and $1\frac{1}{2}$ times the amount necessary to neutralize the acidity of the oil, and in any event is not greater than two times the amount necessary to neutralize such acidity. The separation step is carried out at a relatively low temperature, for example, temperatures between 70° and 110° F. and a moderate pressure is maintained upon the materials being separated during separation in a continuous centrifugal separator. The low temperatures in conjunction with the imposed pressure prevents liberation of carbon dioxide, any carbon dioxide evolved either combining with excess caustic soda to form sodium bicarbonate or remaining in solution in the water forming part of the mixture. Thus pressures between 5 and 50 lbs. per square inch gauge are contemplated, and preferably between 10 and 50 pounds per square inch.

The present process therefore employs soda ash as a refining reagent and eliminates the dehydration and rehydration steps of the commercial soda ash process while at the same time producing a high quality oil with minimum refining losses. That is to say, saponification of neutral oil is substantially absent and the separated soapstock is very low in neutral oil. As in the case of the soda ash process it is desirable to re-refine the oil discharged from the continuous centrifugal separator with a caustic soda solution particularly in the case of highly colored oils, but again, the refining losses in the re-refining step are very low.

It is therefore an object of the present invention to provide an improved process for alkali refining glyceride oils in which refining losses are minimized.

Another object of the invention is to provide a process of alkali refining glyceride oils in which soda ash is employed as the refining reagent and effective separation of neutral oil from soapstock is accomplished without removing the carbon dioxide from the mixture or without employing a large excess of soda ash.

A further object of the invention is to provide an improved process of alkali refining glyceride oils in which soda ash is employed as the refining reagent and the presence of gaseous carbon dioxide during separation of soapstock from neutral oil is prevented by performing the separation at a relatively low temperature and under an imposed pressure.

Other objects and advantages of the invention will appear in the following detailed description thereof in which reference is made to suitable apparatus for carrying out the process, such apparatus being shown in the attached drawing.

Referring to the drawing, oil to be refined may be supplied from the tank 10 and soda ash solution may be supplied from the tank 11. As described below, the admixture of water with the materials being separated either just prior to the separation or during separation may be advantageous and such water may be supplied from the tank 12. The oil may be pumped from the tank 10 by means of a pump 13 and delivered through a heater 14 to a mixer 16. In a similar manner the soda ash solution may be pumped from the tank 11 by means of the pump 17 through a heater 18 to the mixer 16. The oil and soda ash solution are thoroughly and rapidly mixed in the mixer 16, which mixer may be of any known or suitable type and the resulting mixture, under pressure from the pumps 13 and 17, may be delivered through another heater 19 to a centrifugal separator 21. If water is employed as a diluting agent, water may be pumped by the pump 22 through a heater 23 and delivered through a conduit 24 into the entrance of the separator 21.

The pumps 13, 17 and 22 may be proportioning pumps forming part of a proportioning apparatus. That is to say, the three pumps may be driven by a variable speed motor 26 and speed change devices 27 and 28 may be interposed between the motor 26 and the pumps 17 and 22. The various heaters 14, 18, 19 and 23 are shown as including coils 29 positioned in casings 31 through which any desired heating medium, such as steam may be passed by means of the pipe connections 32 and 33. Any other suitable type of heating apparatus may, however, be employed. Although the devices including the coils 29 in the casings 31 have been referred to as heaters, it will be apparent that they are in fact heat exchange devices and can be employed for cooling the material being passed therethrough, if desired, by passing a cooling medium through the casings 31. Thus the various materials may be brought to the desired temperature in the heat exchanger and if no temperature change is required in a particular case, the heat exchanger may be by-passed, or in the case of a mixture, a heat exchanger may be employed to provide greater time of contact between the constituents of the mixture with or without changing the temperature of the mixture.

The centrifugal separator 21 may be of the enclosed or hermetically sealed type and be capable of separating mixtures when the mixtures and separated materials are under pressure. The soda ash reacts with the fatty acids in the oil to form soap and other impurities in the oil are precipitated such that a soapstock is separated from the oil in the separator 21 and discharged as a heavier effluent through a conduit 34. The conduit 34 may communicate at its discharge end with a closed tank 36 in which the discharged soapstock is maintained under approximately the same pressure as that present in the centrifugal separator 21. The soapstock may be discharged from the tank 36 into an open tank 37 through a conduit 38 having a valve 39 therein controlled by a float 41 in the tank 36 as diagrammatically illustrated in the drawing. Similarly, the neutral oil separated from the soapstock in the separator 21 is discharged as the lighter effluent through a conduit 42 into a closed tank 43 which may be similar to the tank 36. That is to say, the neutral oil in the tank 43 is maintained under pressure and is discharged therefrom into an open tank 44 through a conduit 46 having a valve 47 therein under control of a float 48 positioned in the tank 43. The pressure tanks 36 and 43 may be connected by a pressure equalizing conduit 49 and the pressure in the tanks 36 and 43 may be maintained at the desired pressure by means of a pressure regulator valve indicated diagrammatically at 51 and connected to one of the tanks such as the tank 36. The pressure regulator may supply compressed air from the compressor 52 to the tanks 36 and 43 or exhaust gases from the tanks through the conduit 53 so as to maintain a substantially constant pressure in the tanks 36 and 43 and the centrifugal separator 21. The pumps 13, 17 and 22 develop sufficient pressure to force the material through the various heaters and mixer against the pressure maintained in the centrifugal separator and tanks 36 and 43. By equalizing the pressure between the tanks 36 and 43 by means of the conduit 49, the imposed pressure will have no effect upon the discharge of materials through the conduits 34 and 42 of the centrifugal separator 21. The float controlled valves 39 and 47 maintain substantially uniform levels of materials in the tanks 36 and 43, thus discharging material from these tanks at substantially the same rate at which the materials are introduced into the tanks.

Where light colored oils, such as corn oil and peanut oil are being refined, the neutral oil delivered into the tank 44 may constitute the final product and may be discharged from the process through the conduit 54 although it is many times desirable to remove residual impurities from even light colored oils by the re-refining step referred to above. For dark colored oils, for example cottonseed oil, it is usually desirable to subject the refined oil to such a re-refining treatment involving the addition to the oil of a small amount of caustic soda solution. In such cases the oil from the tank 44 may be pumped from such tank by means of a pump 56, passed through a heater 57 and delivered to a mixer 58. Caustic soda solution may be withdrawn from a tank 59 by the pump 61, passed through a heater 62 and delivered to the mixer 58. The mixer 58 may be of any known or suitable type and may be similar to the mixer 16. The resulting mixture may then be passed through another heater 63 and delivered into a continuous centrifugal separator 64. It is, however, usually desirable to add a diluting agent to the mixture just prior to centrifugal separation and this may be accomplished by withdrawing a diluting agent, such as water, from the tank 66 by means of a pump 67, passing the same through a heater 68 and introducing the same into the conduit 69 which supplies the mixture of oil and caustic soda solution to the centrifugal separator 64. The pumps 56, 61 and 67 may form part of a proportioning apparatus similar to that described above and be driven by a variable speed motor 70. The heaters 57, 62, 63 and 68 may be of any known or suitable type and may be similar to the heaters 14, 18, etc. The centrifugal separator 64 may be of the type shown in Clayton Patent No. 2,412,251 in which case the diluting agent may be delivered directly into the centrifugal separator as a flush. In the centrifugal separator 64 the purified oil is separated from the soapstock and discharged as the lighter effluent through the spout 66 into a tank 67 from which it may be withdrawn from the process and a smaller amount of soapstock, containing the diluting agent if employed, is discharged as the heavier effluent through a spout 68 into a tank 69.

In carrying out the process, the soda ash solution admixed with the oil in the mixer 16 may have a concentration between approximately 10° and 20° Bé., concentrations in the lower portion of this range being preferred. As stated above, the amount of solution will be sufficient to provide a moderate excess of soda ash over that necessary to neutralize the acidity of the oil. That is to say, the amount of soda ash will usually range from 1¼ to 1½ times that necessary to neutralize the acidity of the oil and in any case will not be greater than twice that required to neutralize said acidity. In general, the temperature of mixing of the soda ash solution and oil will be between approximately 70° and 110° F., and at such temperatures and under the pressure maintained in the mixer 16 no carbon dioxide will be liberated in the mixture of oil and soda ash solution. It will be appreciated that the pressure in the mixer 16 will be somewhat higher than that in the centrifugal separator 21 since the mixture is ordinarily passed through a heater 19. The heater 19 may be employed to raise the temperature of the oil if the oil is mixed at a temperature below that desired for centrifugal separation. Ordinarily the temperature of the oil leaving the heater 19 will, however, not be greater than approximately 110° F. That is to say, all of the heating of the oil and soda ash solution may be done in the heaters 14 and 18 or all of the heat may be imparted in the heater 19 or a portion of the heating may be performed in the heaters 14 and 18 and a portion in the heater 19. The heater 19 is advantageous for providing a longer time of contact between the soda ash solution and the oil before separation even if no heat is supplied to the mixture therein. It is apparent that it is desirable to separate at the lowest temperature at which effective separation can be accomplished and a satisfactory refined oil produced. If no heat is required, the heaters 14 and 18 can be by-passed and in some cases even the heater 19 can be by-passed.

It is also apparent that the oil and soda ash solution can be raised to a relatively high temperature, for example, temperatures between 110° and 180° F. in the heaters 14 and 18 and mixed at such temperature in the mixer 16. If any carbon dioxide is liberated at the higher temperatures, the mixture can then be cooled in the heat exchange device 19 down to a temperature at which carbon dioxide is again absorbed or dissolved in the mixture or to a temperature at which the carbon dioxide will be dissolved or absorbed after addition of water from the tank 12. Although water has been referred to as the diluting agent, other aqueous materials such as solutions of soda ash and sodium sulfate, in concentrations up to about 20° Bé., may be employed.

The various factors such as the amount and concentration of soda ash solution employed, the pressure employed, the temperature of separation and the amount of diluting agent added to the mixture prior to or during separation are interrelated. That is to say, the greater the excess of soda ash and the greater the amount of water added either as part of the initial soda ash solution or as part of a diluting agent such as a flush in the centrifuge as well as the lower the temperature of separation, the lower the imposed pressure in the centrifugal separator necessary to prevent liberation of carbon dioxide. In other words, the greater the total amount of soda ash, the greater the amount of total water in the centrifuge, the lower the temperature and the higher the pressure, the less tendency for carbon dioxide to be liberated. In general, it is desirable to employ as low a pressure as practicable, consistent with a moderate excess of soda ash and the avoidance of an excessive amount of water in the mixture being separated. Such pressures will range from approximately 10 to 50 lbs. per square inch gauge. On the other hand, effective separation is more easily accomplished at the higher temperatures within the range given and the pressure, amount of water and excess of soda ash should be sufficient to prevent liberation of carbon dioxide at the temperature employed. Thus all of the factors must be balanced against each other to prevent the presence of a substantial amount of gaseous carbon dioxide in the centrifugal separator since such gaseous carbon dioxide will adhere to the soapstock to reduce its specific gravity and prevent effective separation of the soapstock from the oil.

Continuous centrifugal separators of the so-called hermetically sealed type are available and can be employed to separate materials under moderate pressures. It is even possible to employ a conventional open type of continuous centrifugal separator by surrounding the same with a closed pressure chamber through the walls of which the various inlet and outlet conduits extend and venting the closed chamber to closed receiving tanks such as the tanks 36 and 43 in which the separated materials are under pressure.

As stated above, light colored oils delivered into the tank 44 from the refining step just described may be discharged from the process as refined oil but dark colored oils, in general, do not have their color sufficiently removed in the process just described. Furthermore, even light colored oils are usually benefitted by re-refining with caustic soda in accordance with the disclosure of Clayton Patent No. 2,412,251. Thus in accordance with the disclosure of such patent, the oil from the tank 44 may be admixed with a caustic soda solution in the mixer 58 and sent to the centrifugal separator 64. A diluting agent, for example water, or a dilute solution of soda ash may be injected into the mixture of oil and caustic soda solution just prior to introduction of the mixture into the centrifugal separator 64 or within the centrifugal separator itself as disclosed in such patent.

The concentration of the caustic soda solution from the tank 59 will, in general, range between 20° and 50° Bé., and the amount of such solution will usually range between approximately 0.5% and 4%, the quantity most generally used being in the neighborhood of 2% based on the weight of the oil. The temperature of mixing is preferably between 70° and 100° F., although for removing certain types of impurities this temperature may be as high as 130° F. to 140° F., the heaters 57 and 62 being employed for adjusting the temperature of the materials being mixed in the mixer 58. The temperature of separation will usually range between 120° and 180° F., and preferably between 120° and 160° F., although with some oils this temperature may be as low as 100° F. Water is the preferred diluting agent and the amount of water will ordinarily range between approximately 2.5 and 10 times the weight of caustic soda solutioin employed. In general, it has been found desirable to reduce the concentration of the excess caustic soda solution in the centrifugal separator to at least 8° Bé. although in some instances concentrations up to 10° or 12° Bé. have been found operable and in other cases, concentrations as low as 4° Bé. have been found advantageous. The heavier effluent discharged through the spout 68 contains a small amount of soap, and in any event, the amount of water or other diluting agent employed in the centrifugal separator should be sufficient to cause the soap to cleanly separate from the oil in solution or dispersion in the aqueous phase. The temperature of the diluting agent should, in general, be at least as high as the temperature of the oil and caustic soda mixture entering the centrifugal separator and may be somewhat higher.

It is usually desirable to subject the oil discharged from the re-refining step, or if no re-refining step is employed, the oil discharge from the initial refining step, to a water washing treatment involving mixing of water with the oil in an amount between approximately 5 to 20% of the oil by weight and centrifugally separating the water from the oil.

The present process is thus an improvement over the commercial caustic soda process in that it materially reduces the refining losses including losses due to saponification of neutral oil and entrainment of neutral oil in the soapstock and is an improvement over the commercial soda ash process in that it eliminates the dehydration and rehydration steps employed therein while at the same time resulting in refining losses as low or lower than the soda ash process.

The process of the present invention is applicable to substantially all types of glyceride oils including animal, vegetable and marine oils as it is sufficiently flexible to produce a high quality oil with low losses when employed to refine nearly any type of glyceride oil likely to be encountered. It is particularly effective for the refining of low free fatty acid oils or crude oils having a high ratio of gums to free fatty acids although the process is also effective for the refining of previously degummed oils.

I claim:

1. The process of alkali refining a glyceride oil, which comprises, mixing said oil with an aqueous solution of soda ash having a concentration between approximately 10° and 20° Bé. and in an amount between approximately 1¼ and 2 times that necessary to neutralize the acidity of said oil, heating the resulting mixture to a temperature between 110° and 180° F., then cooling said mixture and thereafter continuously centrifugally separating the resulting mixture into soapstock and oil at a temperature between approximately 70° and 110° F., and maintaining said mixture and the separated soapstock and oil under sufficient imposed pressure during said separating to prevent gaseous carbon dioxide from interfering with said separation.

2. The process of alkali refining a glyceride oil, which comprises, mixing said oil with an aqueous solution of soda ash having a concentration between approximately 10° and 20° Bé. and in an amount between approximately 1¼ and 2 times that necessary to neutralize the acidity of said oil, thereafter continuously centrifugally separating the resulting mixture into soapstock and oil at a temperature between approximately 70° and 110° F. and maintaining said mixture and the separated soapstock and oil under sufficient imposed pressure during said separating to prevent gaseous carbon dioxide from interfering with said separation.

3. The process of alkali refining a glyceride oil, which comprises, mixing said oil with an aqueous solution of soda ash having a concentration between approximately 10° and 20° Bé. and in an amount between approximately 1¼ and 2 times that necessary to neutralize the acidity of said oil, thereafter continuously centrifugally separating the resulting mixture into soapstock and oil at a temperature between approximately 70° and 110° F. and maintaining said mixture and the separated soapstock and oil during said separating under an imposed pressure between approximately 10 and 50 lbs. per square inch gauge.

4. The process of alkali refining a glyceride oil, which comprises, mixing said oil with an aqueous solution of soda ash having a concentration between approximately 10° and 20° Bé. and in an amount between approximately 1¼ and 2 times that necessary to neutralize the acidity of said oil, thereafter continuously centrifugally separating the resulting mixture into soapstock and oil at a temperature between approximately 70° and 110° F. and maintaining said mixture and the separated soapstock and oil during said separating under an imposed pressure between approximately 10 and 50 lbs. per square inch gauge, and thereafter mixing the separated oil with an aqueous solution of caustic soda and continuously centrifugally separating the resulting soapstock therefrom to produce a purified oil.

BENJAMIN CLAYTON.

REFERENCES CITED

The following references are of record in the file of this patent:

UNITED STATES PATENTS

| Number | Name | Date |
|---|---|---|
| 1,575,061 | Jones et al. | Mar. 2, 1926 |
| 2,301,110 | Clayton | Nov. 3, 1942 |